(12) United States Patent
Murakami et al.

(10) Patent No.: US 9,731,476 B2
(45) Date of Patent: Aug. 15, 2017

(54) COMPOSITE METAL SHEET (71) Applicant: Yazaki Corporation, Tokyo (JP)

(72) Inventors: Kazuhiro Murakami, Susono (JP);
Kazuhide Takahashi, Makinohara (JP);
Kimitoshi Makino, Kosai (JP);
Yoshihiko Watanabe, Susono (JP)

(73) Assignee: Yazaki Corporation, Tokyo (JP)

( * ) Notice: Subject to any disclaimer, the term of this patent is extended or adjusted under 35 U.S.C. 154(b) by 12 days.

(21) Appl. No.: 14/870,616

(22) Filed: Sep. 30, 2015

(65) Prior Publication Data
US 2016/0016384 A1 Jan. 21, 2016

Related U.S. Application Data (60) Division of application No. 14/168,515, filed on Jan. 30, 2014, now Pat. No. 9,421,735, which is a
(Continued)

(30) Foreign Application Priority Data

Sep. 12, 2007 (JP) .................. 2007-237008

(51) Int. Cl.
*B21D 39/03* (2006.01)
*B32B 7/08* (2006.01)
(Continued)

(52) U.S. Cl.
CPC .............. *B32B 7/08* (2013.01); *B21D 39/034* (2013.01); *B32B 3/266* (2013.01); *B32B 3/30* (2013.01);
(Continued)

(58) Field of Classification Search
CPC ......... Y10T 29/49833; Y10T 29/49835; Y10T 29/49837; Y10T 29/49936; B21D 39/034; B21D 39/035
See application file for complete search history.

(56) References Cited

U.S. PATENT DOCUMENTS 2,135,807 A 11/1938 Fitzgerald
2,901,816 A 9/1959 Smith
(Continued)

FOREIGN PATENT DOCUMENTS

CH 575273 A5 5/1976
CN 101501348 8/2009
(Continued)

OTHER PUBLICATIONS

German Office Action dated Feb. 5, 2010, issued in German Patent Application No. 10 2008 046 776.6-14.
(Continued)

*Primary Examiner* — Jermie Cozart
(74) *Attorney, Agent, or Firm* — Locke Lord LLP (57) ABSTRACT The invention provides a composite metal sheet produced by joining two metal sheets together, comprising: a projection formed by cutting the two metal sheets along a cutting line and pressing an area surrounded by the cutting line and a reference line in the two metal sheets, with the two metal sheets overlapping each other, with the reference line remaining uncut, with the cutting line extending from and communicating with both terminals of the reference line while forming a predetermined shape together with the reference line, and with the projection formed at one portion of the area in response to pressure applied to the area; hole generated by forming the projection in the two metal sheets; and a joint disposed between an outer peripheral cutting face of the projection and an inner peripheral cutting face of the hole.

5 Claims, 8 Drawing Sheets

Related U.S. Application Data continuation-in-part of application No. 12/232,126, filed on Sep. 11, 2008, now abandoned.

(51) Int. Cl.
| | | |
|---|---|---|
| *B32B 15/01* | (2006.01) | |
| *B32B 3/26* | (2006.01) | |
| *B32B 3/30* | (2006.01) | |

(52) U.S. Cl.
CPC ............ *B32B 15/01* (2013.01); *B21D 39/035* (2013.01); *B32B 2250/02* (2013.01); *B32B 2311/00* (2013.01); *Y10T 29/49833* (2015.01); *Y10T 29/49835* (2015.01); *Y10T 29/49837* (2015.01); *Y10T 29/49936* (2015.01); *Y10T 29/53996* (2015.01); *Y10T 428/12451* (2015.01); *Y10T 428/24289* (2015.01)

(56) References Cited

U.S. PATENT DOCUMENTS

| | | |
|---|---|---|
| 3,251,617 A | 5/1966 | Zinniger |
| 3,304,955 A | 2/1967 | Zinniger |
| 3,919,955 A | 11/1975 | DuVernay |
| 3,934,327 A | 1/1976 | Hafner |
| 5,305,517 A | 4/1994 | Schleicher |
| 5,577,313 A | 11/1996 | Guido et al. |
| 2009/0311551 A1 | 12/2009 | Ueta |

FOREIGN PATENT DOCUMENTS

| | | |
|---|---|---|
| DE | 1 452 742 A1 | 10/1969 |
| EP | 1 629 905 A1 | 3/2006 |
| FR | 2358214 | 2/1978 |
| JP | 61-182830 A | 8/1986 |
| JP | 09-174117 A | 7/1997 |
| JP | 11-047854 A | 2/1999 |
| JP | 2003-181572 A | 7/2003 |

OTHER PUBLICATIONS

Office Action for Chinese Patent Application 200810178530.X issued Aug. 11, 2010.
Notification of Second Office Action for Chinese Patent Application 200810178530.X issued Jul. 28 2011.
Notification of Reasons for Rejection (Non-Final) for Application No. 2007-237008 dated Nov. 20, 2012.
Written translation of JP56-123775 Kurihara.
JP 56-123775 Sep. 21, 1981.

FIG.12A less ← amount of caulk → greater

FIG.12B less ← amount of caulk → greater

COMPOSITE METAL SHEET

CROSS-REFERENCE TO RELATED APPLICATIONS

This application is a divisional application of U.S. application Ser. No. 14/168,515 filed Jan. 30, 2014, now U.S. Pat. No. 9,421,735 B2 which is a continuation-in-part of, and claims the priority benefit of, U.S. application Ser. No. 12/232,126 filed Sep. 11, 2008, now abandoned which claims the right of priority under 35 U.S.C. §119 based on Japanese Patent Application No. 2007-237008 filed Sep. 12, 2007, the entirety of which is incorporated by reference herein.

BACKGROUND OF THE INVENTION

1. Field of the Invention

The present invention relates to a composite metal sheet, a method for joining metal sheets, and a device for joining metal sheets. In particular, the present invention relates to a composite metal sheet formed by joining two metal sheets, a method for joining two metal sheets, and a device for joining two metal sheets.

2. Description of the Related Art

Conventionally, for joining metal sheets together swaging these metal sheets together has already been known in the art. However, such a swaging technology has a defect that satisfactory electrical property cannot be achieved. This is because such a technology only depends on remaining stress and contact force occurring in response to swaging treatment. Also, there is a plurality of gaps in the area of contact, which generally causes corrosion in the corresponding area. As a result, long term-electrical property is hardly kept.

Furthermore, to achieve such a long-term electrical property, it is proposed to join metal sheets together by soldering via plasma. Meanwhile, such a method has a defect that process automation is difficult to set up, and therefore is not suited for large-scale manufacture. Accordingly, it is not cost-effective job.

To solve the afore-mentioned problems, the present inventors have studied a composite metal sheet having remarkably enhanced electrical property and reliability, a cost-effective method for preparation the same, and a cost-effective device for producing the same.

SUMMARY OF THE INVENTION

In accordance with an aspect of the present invention, there is provided a composite metal sheet produced by joining two metal sheets together; comprising: a projection formed by cutting the two metal sheets along a cutting line and pressing an area surrounded by the cutting line and a reference line in the two metal sheets, with the two metal sheets overlapping each other, with the reference line remaining uncut, with the cutting line extending from and communicating with both terminals of the reference line while forming a predetermined shape together with the reference line, and with projection formed at one portion of the area in response to pressure applied to the area; a hole generated by forming the projection in the two metal sheets; and a joint disposed between an outer peripheral cutting face of the projection and an inner peripheral cutting face of the hole.

Preferably, the cutting line substantially forms a trapezoidal shape together with the reference line with the reference line being a short side.

Preferably, two cutting lines are disposed with reference to the reference line.

In accordance with another aspect of the present invention, there is provided a method for joining two metal sheets together, comprising: overlapping the two metal sheets; and subsequently, cutting the two metal sheets along a cutting line and pressing an area surrounded by the cutting line and a reference line and disposed in the two metal sheets so as to form a form a projection at one portion of the area in response to pressure applied to the area, with the reference line remaining uncut, with the cutting line extending from and communicating with both terminals of the reference line while forming a predetermined shape together with the reference line, and with a hole generated by forming the projection in the two metal sheets, wherein the area is pressed so that the projection reaches an inner peripheral cutting face of the hole.

In accordance with still another aspect of the present invention, there is provided a device for joining metal sheets, comprising: a first press die having a recess disposed therein, wherein the recess has a shape equivalent to or corresponding to an area surrounded by the cutting line and a reference line and disposed in the metal sheets, and has a depth of minimum at the reference line and a depth of maximum at its peripheral edge opposed to the reference line, with the reference line remaining uncut, and with the cutting line extending from and communicating with both end portions of the reference line while forming a predetermined shape together with the reference line; and a second press die having a projection suited for being received in the recess disposed in the first press die, and having a height of minimum at the reference line and a height of maximum at its peripheral edge opposed to the reference line.

DETAILED DESCRIPTION OF THE INVENTION

Figure 1:
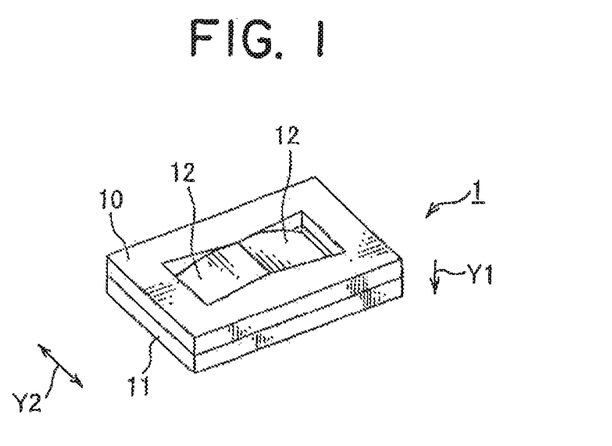
FIG. 1 is a partially perspective view of an embodiment of a composite metal sheet in accordance with the present invention.
Figure 2:
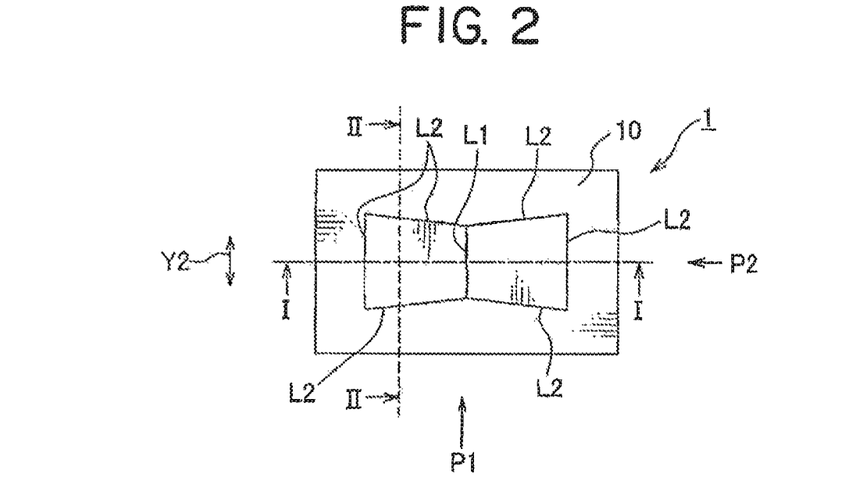
FIG. 2 is a top view of the composite metal sheet of FIG. 1.
Figure 3:
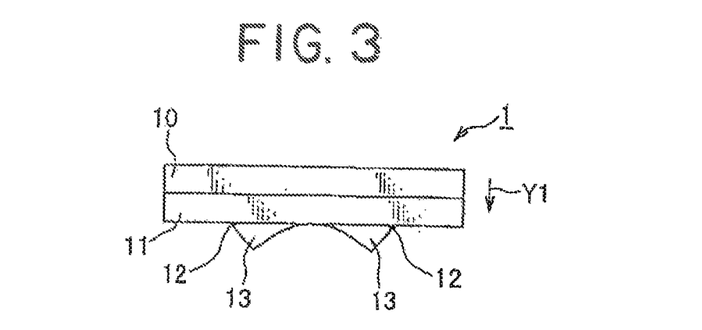
FIG. 3 is a view for illustrating the composite metal sheet viewed in a direction of an arrow P1 of FIG. 2.
Figure 4:
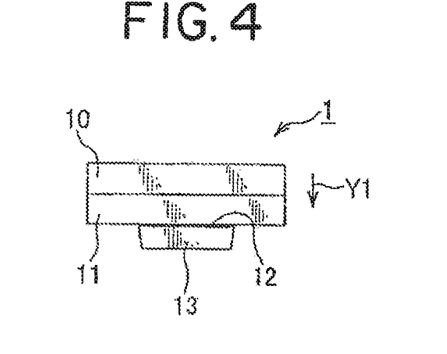
FIG. 4 is a view for illustrating the composite metal sheet view in a direction of an arrow P2 of FIG. 2.
Figure 5:
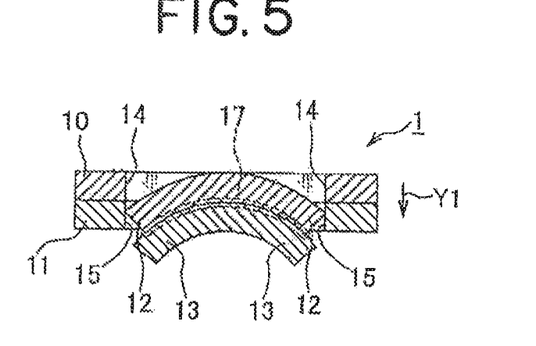
FIG. 5 is a cross sectional view taken along line I-I of FIG. 2.
Figure 6:
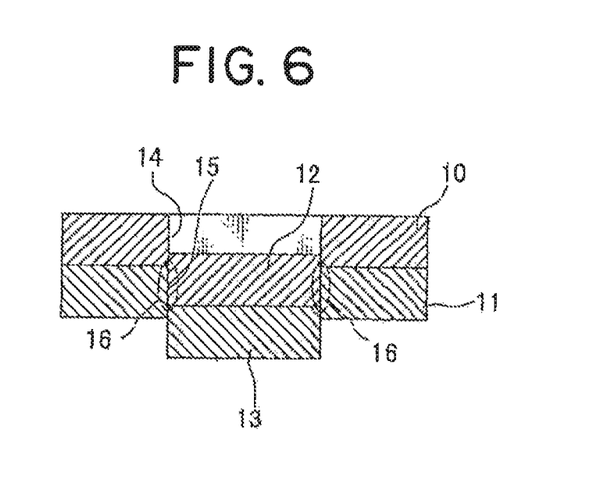
FIG. 6 is a cross sectional view taken along line II-II of FIG. 2.

Several embodiment of the present invention will be hereinafter described in great detail with reference to drawings attached hereto. FIG. 1 is a partially perspective view of a composite metal sheet 1 in accordance with the present invention. FIG. 2 is a top view of the composite metal sheet 1 of FIG. 1. FIG. 3 is a view for illustrating the composite metal sheet viewed in a direction of an arrow of FIG. 2. FIG. 4 is a view for illustrating the composite metal sheet view in a direction of an arrow P2 of FIG. 2. FIG. 5 is a cross sectional view taken along line I-I of FIG. 2. FIG. 6 is a cross sectional view taken along line II-II of FIG. 2.

As shown in the drawings attached hereto, a composite metal sheet 1 comprises two metal sheets 10 and 11. As shown in FIG. 5, the composite metal sheet 1 comprises projections 12 and 13, holes 14 and 15, and a joint 16 (see FIG. 6).

Projection 12 is formed in the metal sheet 10. Projection 13 is formed in the metal sheet 11. As shown in FIG. 2, the projections 12 and 13 are respectively generated from each end portion of the metal sheets by cutting the two metal sheets 10 and 11 along a cutting line L2 and pressing an area surrounded by the cutting line and a reference line L1 and disposed in the two metal sheets, with the two metal sheets overlapping each other, with the reference line remaining uncut, with the cutting line extending from and communicating with both terminals of the reference line while forming a predetermined shape together with the reference line. In this case, the projections 12 and 13 are formed in a direction of an arrow Y1. In other words, the projections 12 and 13 will be thus produced at one portion of the area in response to pressure applied to the area. For example, the projections 12 and 13 can be produced approximately at or along an edge opposed to the reference line L1 in the area. Preferably, two cutting lines L2 are disposed with reference to the reference line L1.

Figure 7:
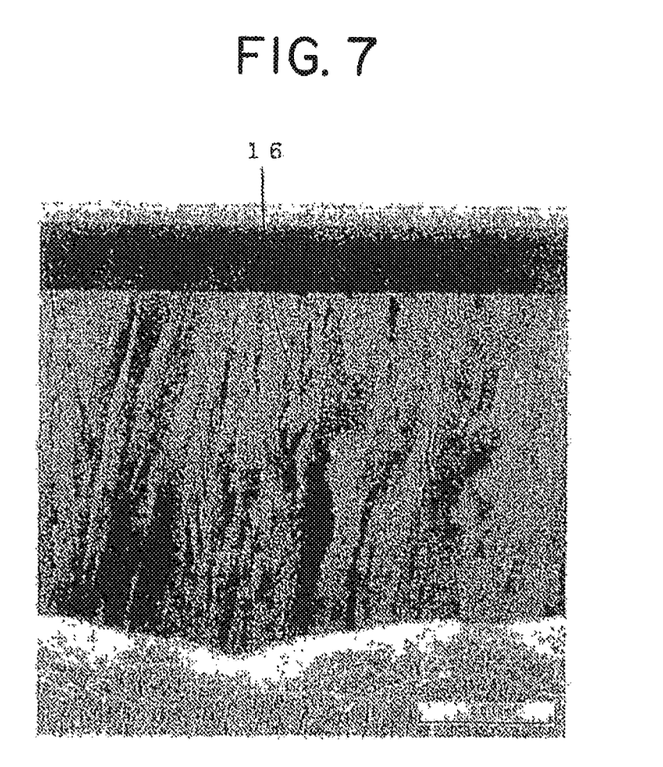
FIG. 7 is a picture of the composite metal sheet of FIG. 6.

The hole 14 is achieved by forming the projection 12 in the metal sheet 10. Also, the hole 15 is achieved by forming the projection 13 in the metal sheet 11. The projection 12 of the metal sheet 10 is at least partly squeezed into the hole 15 disposed in the metal sheet 11. In some detail, the outer peripheral cutting face of the projection 12 scuffs the inner peripheral cutting face of the hole 15. Owing to this friction, oxide layers coated on both faces are eliminated, and uncoated outer peripheral cutting face of the projection 12 and the uncoated inner peripheral cutting face of the hole 15 come in contact with each other. As a result, as shown in FIGS. 6 and 7, a joint 16 is produced between an outer peripheral cutting face of the projection and an inner peripheral cutting face of the hole. Furthermore, the lower face of the projection 12 and the upper face of the projection 13 deforms, as pressure applies thereto. Due to above deformation, there also occurs friction in an area where the two projections 12 and 13 overlap each other, resulting in a joint 17 as shown in FIG. 5.

In the case of using the composite metal sheet 1, when pressure being applied thereto in a direction of arrow Y1, there occurs friction between the outer peripheral cutting face of the projection 12 and the inner peripheral cutting face of the hole 15. Due to this friction, the composite metal sheet 1 is provided with the joint 16, and thus it shows remarkably enhanced electrical property and reliability.

Further, in accordance with the afore-mentioned composite metal sheet 1, because metal sheets 10 and 11 can be easily joined together by means of conventional press process, no specified and expensive equipment is needed for joining metal sheets together. Accordingly, cost-effective job can be realized by the present invention.

With reference to FIG. 2, the area surrounded by the reference line L1 and the cutting line L2 has an approximately trapezoidal shape with the reference line being a short side. In other words, as an edge of the cutting line L2 which is a generally parallel to the reference line L1 is made closer to the reference line L1, the length of the edge becomes shorter. More specifically, with reference to FIG. 2, the edge can be considered to extend along in a direction of an arrow Y2.

In accordance with such a construction, when the projections 12 and 13 are pressed in a predetermined direction (for example, downward), the projection 12 is at least partly squeezed into the hole 15. As a result, there occurs normal load between the outer peripheral cutting face of the projection 12 and the inner peripheral cutting face of the hole 15. Accordingly, joining the metal sheets 10 and 11 can be facilitated and therefore jointing strength between the two metal sheets can be enhanced.

Also, in the case of using the composite metal sheet 1, two cutting lines L2 are formed with reference to the reference line L1. Due to this configuration, it is possible to obtain two joints 16 disposed relative to above one reference line L1. As a result, electrical property and reliability can be remarkably enhanced.

The details of adhesion phenomenon occurring in the metal joint portion are illustrated below. When two solid objects (i.e., two metallic plates) are contacted with each other, adhesion follows the following formula.

$$A_u = \zeta P/P_m$$

In the above formula, $A_a$ is an adhesion area when two solid objects are contacted with each other, $\zeta$ is a coefficient of surface state and material in combination (i.e., a surface coefficient), $P$ is a normal load, and $P_m$ is a plastic flow pressure of material. Furthermore, a representative factor associated with the surface coefficient $\zeta$ includes surface dirties, material purity, hardness, a melting point, a processing hardening coefficient, surface energy/hardness, crystalline structure and etc. The surface coefficient $\zeta$ is inversely proportional to surface dirties, hardness, and melting point, but is proportional to material purity, processing hardening coefficient, surface energy/hardness. Regarding the crystalline structure, cubical crystal has greater value of $\zeta$ and hexagonal crystal has less value of $\zeta$.

Once the contact surfaces slide on each other, friction occurs between the contact surfaces. Considering that friction is equal to the sum of adhesion and fracture notch, it is apparent that an amount of friction is in a correlation with an amount of adhesion. Furthermore, the amount of friction follows the following formula.

$$W = \zeta \eta PL/3P_m$$

In the above formula, W is an amount of friction, $\eta$ is an adhesion probability, L is a friction distance, and $\zeta$, P, and $P_m$ are as defined above.

In accordance with the above formula, in order to increase an amount of adhesion, P (normal load), $\zeta$ (surface coefficient), and L (friction distance) should be increased. In particular, metal joining or metal joint can be obtained at contact point by setting $1 > P/P_m$. For this reason, electrical connection stability between the phases can be enhanced.

In order to utilize the above adhesion phenomenon, for example, a parameter for increasing an amount of adhesion is introduced, P, $\zeta$, and L are increased due to shape, or a simple structure of only driving is employed. For this purpose, metal joining process using a bow tie-shaped die has been studied. Due to the adhesion phenomenon, electrical connection between the phases is further stabilized.

Figure 8:
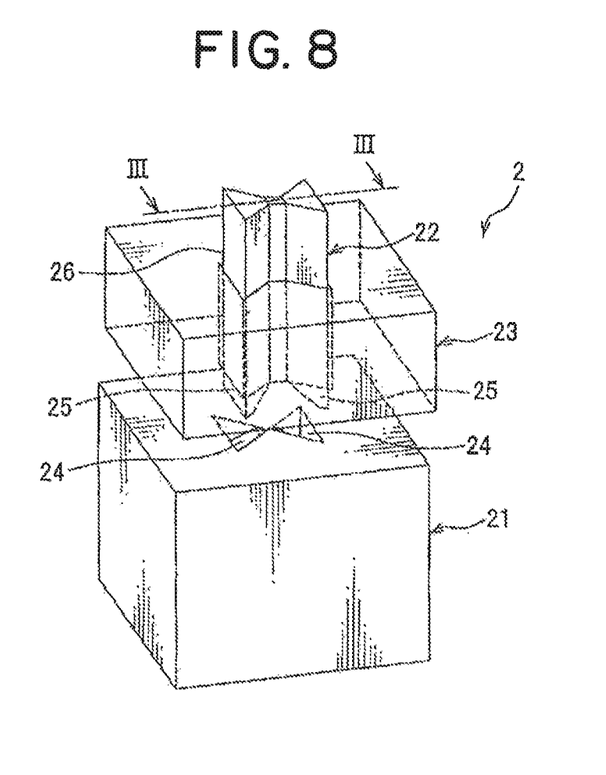
FIG. 8 is a perspective view of an embodiment of a metal-joining device in accordance with the present invention.
Figure 9A:
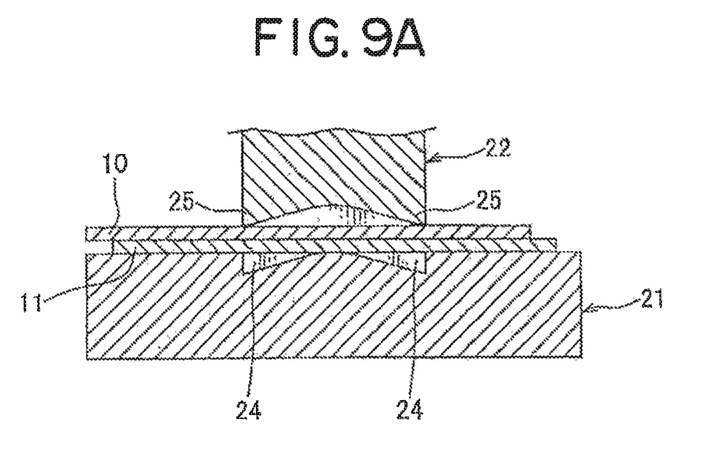
FIGS. 9A and 9B are cross sectional views taken along line of FIG. 8.
Figure 9B:
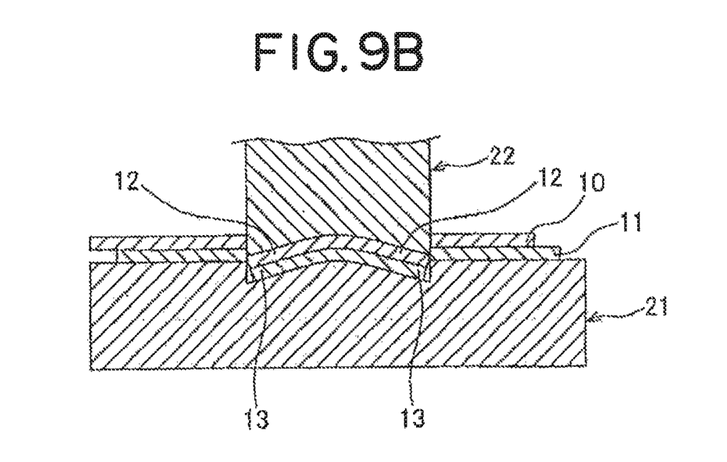

With reference to FIGS. 8 and 9, a device 2 for joining two metal sheets 10 and 11 together will be hereinafter illustrated in great detail. FIG. 8 shows a perspective view of an embodiment of a device for joining metal sheets in accordance with the present invention. FIG. 9 shows a cross sectional view taken along line of FIG. 8. As shown in FIGS. 8 and 9, the metal-joining device 2 comprises a first press die 21, a second press die 22, and a guide 23.

The first press die 21 is, for example, formed in the shape of rectangular solid, and has two recesses 24 disposed its top face. Each of these recesses 24 has a shape equivalent to or corresponding to the area surrounded by the cutting line L2 and the reference line L1 in the metal sheets 10 and 11. In other words, the respective recess has the corresponding approximately trapezoidal shape. Also, the recess 24 generally has a depth of 0 or is shallow enough to prevent the reference line L1 from being cut.

The second press die 22 generally has a bar-shape. According to its top view; two trapezoids are connected to each other via their short sides. Its overall shape generally seems a bow tie. The second press die 22 is provided with a pair of projections 25 at its leading end portion with respect to the pressing direction of arrow Y1. The two projections 25 are suited for being received in or inserted into two afore-mentioned recesses 24. In addition, the two projections 25 substantially have a height of minimum at or around the reference line and a height of maximum at its peripheral edge opposed to the reference line. In other words, the projections 25 are substantially symmetrically inclined with reference to the reference line L1.

The guide 23 is, for example, formed as a rectangular solid and has a guide hole 26 therethrough. The guide hole 26 is provided for passing the second press die 22 therethrough, and therefore has a cross-section equivalent to or corresponding to the recess disposed in the second press die. For reference, the second press die 22 has the cross section which two trapezoids are interconnected via their short sides. In other words, just like the second press die 22 mentioned previously, the guide hole 26 generally seems a bow tie. Due to this guide hole 26, the second press die 22 is guided to the direction of the arrow Y1. When used herein, applying pressure is carried out in the direction of the arrow Y1.

A method for joining metal sheets by use of the afore-mentioned metal-joining device 2 will be hereinafter described in great detail. With reference to FIG. 9(A), two metal sheets 10 and 11 are overlapped on the first press die 21. Subsequently, the second press die 22 is moved along the guide hole 26 of the guide 23 in the direction of the arrow Y1. By such a movement of the second press die 22, two metal sheets 10 and 11 are caught or sandwiched between the first press die 21 and the second press die 22.

When the second press die 22 is further moved in the direction of the arrow Y1, the metal sheets 10 and 11 are cut along the edge of the projection 25 and the edge of the recess 24. Briefly, the metal sheets 10 and 11 are cut along the cutting line L2. At the same time, the area of the metal sheets 10 and 11 surrounded by the cutting line L2 and the reference line L1 is pressed in the direction of the arrow of Y1, the projection 12 of the metal sheet 10 is at least partly squeezed into the hole 15 of the metal sheet 11. As a result, the joint 16 where the outer peripheral cutting face of the projection 12 and the inner peripheral cutting face of the hole 15 are closely in contact with each other is achieved.

Figure 10:
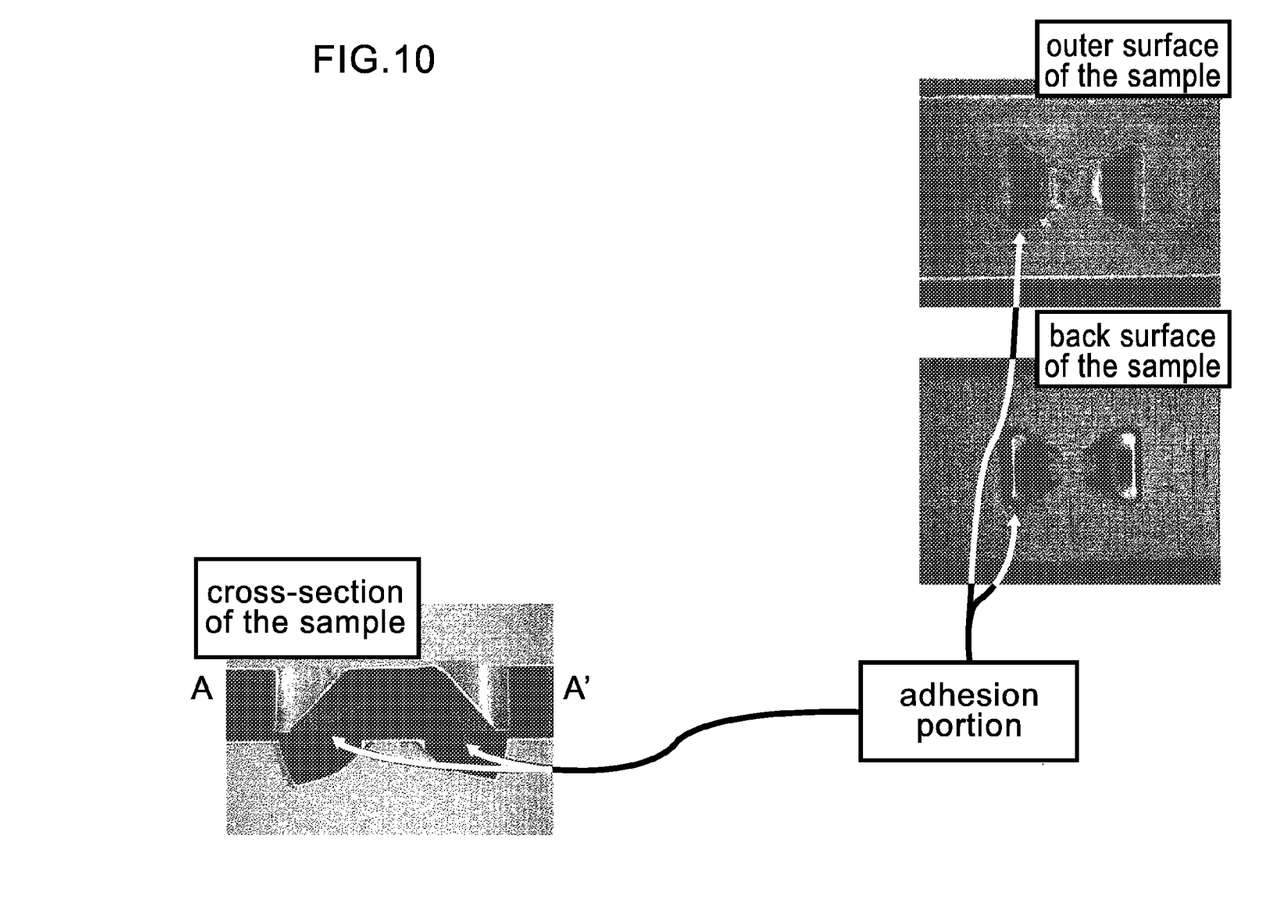
FIG. 10 shows a cross-section, a back surface, and an outer surface of metal joint obtained by using a bow tie-shaped die.

FIG. 10 shows a cross-section, a back surface, and an outer surface of metal joint obtained by using the bow tie-shaped die. In the embodiment as shown in FIG. 10, cutting of the metal plates and pressing of the metal plates are performed simultaneously. More precisely, due to the pressing the metal plates are cut. As a result, a side surface of the pressed portion is subject to adhesion. A longer side is squeezed or squashed into a shorter side, normal load can be increased.

Figure 11A:
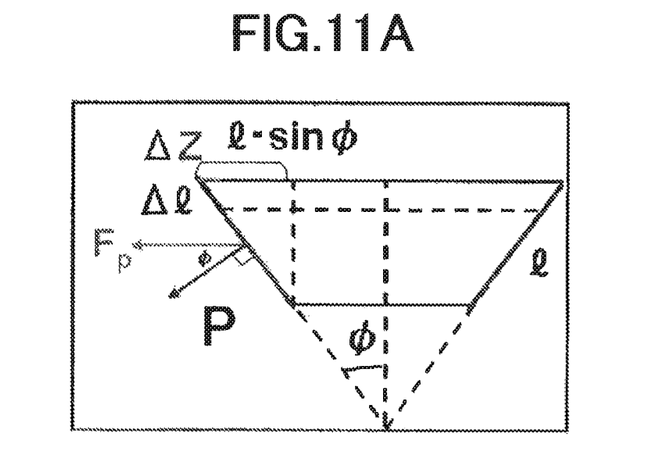
FIG. 11A and FIG. 11B illustrate a principle a bow tie-shaped die utilizing adhesion phenomenon.
Figure 11B:
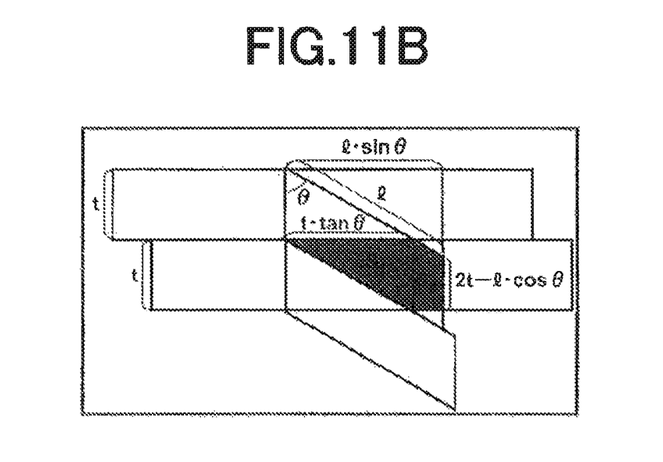

A caulk is performed by plunging an upper die and is supported by a lower die. Calculation depends on the squashing or squeezing position of the upper die. In one example in which the length of the oblique side is l, squashing or squeezing angle is θ, and the thickness of the plate is t, the calculation will follow the formula below. For more detail, see FIGS. 11A and 11B. The contact area can be calculated using the following formula.

$$S_1 = \frac{t \cdot \tan\theta \cdot t}{2} = \frac{t^2 \cdot \tan\theta}{2}$$

$$S_2 = \frac{((2t - \ell \cdot \cos\theta) + t) \cdot (\ell\cos\theta - t)\tan\theta}{2} = \frac{(3t - \ell \cdot \cos\theta) \cdot (\ell\cos\theta - t)\tan\theta}{2}$$

$$\therefore S_1 + S_2 = \frac{t^2 \cdot \tan\theta}{2} + \frac{(3t - \ell \cdot \cos\theta) \cdot (\ell\cos\theta - t)\tan\theta}{2}$$

$$= \frac{\tan\theta}{2}[t^2 + (3t - \ell \cdot \cos\theta) \cdot (\ell\cos\theta - t)]$$

When Hooke's low is applied, the following formula is obtained. See FIG. 11A.

$$F_p = k \cdot x = \frac{S \cdot Y}{\ell \cdot \sin\phi} \cdot \Delta Z \quad \left(k = \frac{S \cdot Y}{\ell \cdot \sin\phi}\right) \quad S: 接触面積 \\ Y: ヤング率$$

$$\Delta Z = \Delta\ell \cdot \sin\phi$$

$$\Delta\ell = \ell - \ell \cdot \sin\theta = \ell(1 - \sin\theta)$$

$$F = \frac{F_p}{\cos\phi} = \frac{\frac{S \cdot Y}{\ell \cdot \sin\phi} \cdot \ell(1 - \sin\theta) \cdot \sin\phi}{\cos\phi} = \frac{S \cdot Y}{\ell \cdot \sin\phi} \cdot \ell(1 - \sin\theta) \cdot \tan\phi$$

In above formula, S is a contact area, and Y is a Young's modulus.

In view of the above formula, the greater opening angle φ is, the greater normal load and normal stress are. Greater normal load and normal stress would be advantageous for adhesion. In other words, due to the presence of opening angle area of plastic deformation can be obtained.

In view of the above, the longer side of the bow tie-shaped die is pressed or plunged (squashed or squeezed) into the shorter side of the bow tie-shaped die so as to further increase normal load. As such, a surface area can be set or determined by using an oblique line of a bow-tie shaped die and squashing or squeezing angle.

In accordance with the afore-mentioned metal-joining device 2, since metal sheets 10 and 11 can be easily joined together by means of conventional press process, no specified and expensive equipment is needed for the purpose of joining metal sheets together. Accordingly, cost-effective job can be realized.

While the afore-mentioned embodiment of the present invention discloses that the area surrounded by the reference line L1 and the cutting line L2 is approximately trapezoidally-formed, the present invention is not limited to the afore-mentioned embodiment. For example, the area surrounded by the reference line L1 and the cutting line L2 may be, not approximately trapezoidally-shaped, but approximately rectangularly-shaped. In this case, the edge of the cutting line L2 approximately opposed to or parallel to the reference line L1 has a length equivalent to or corresponding to the reference line L1. The length of the edge can be herein expressed as "Y2". Otherwise, "Y2" may be herein referred to the direction.

While the afore-mentioned embodiment of the present invention is provided with two cutting line L2, the present invention is not limited to the afore-mentioned embodiment. In other words, for example, only one cutting line may be provided with respect to one reference line L1.

Further, while the afore-mentioned embodiment of the present invention only discloses that the metal sheets 10 and 11 are cut and pressed, the present invention is not limited to the afore-mentioned embodiment. In other words, the metal sheets 10 and 11 can be further subjected to heating treatment simultaneously or after the afore-mentioned cutting and pressing process for the purpose of interdiffusion of the metal sheets. As a result, metal sheets can be joined together more firmly within their broader areas.

By means of the afore-mentioned composite metal sheet, method for joining metal sheets, and device for joining metal sheets in accordance with the present invention, electric property and reliability of the composite metal sheet can be remarkably enhanced.

Joining mechanism and procedure will be explained in detail by the following examples.

[Joining Procedure]
Material and Evaluation

Copper plate/reflow Sn plating was used as a material for an upper die side and copper alloy plate/reflow Sn plating was used as a material for a lower die side. Metal joint samples were prepared at an opening angle $2\phi=30$ degrees. While varying an amount of caulk (i.e., squash or squeeze amount) joint interfaces of the samples were subjected to metallurgical microscope and electron microscope observation (FIB/SIM, STEM/EDX).

Results

Figure 12A:
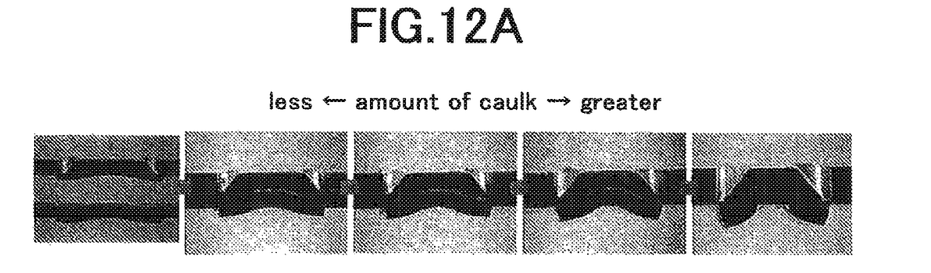
FIG. 12A shows an appearance of the cross-section of the sample.
Figure 12B:
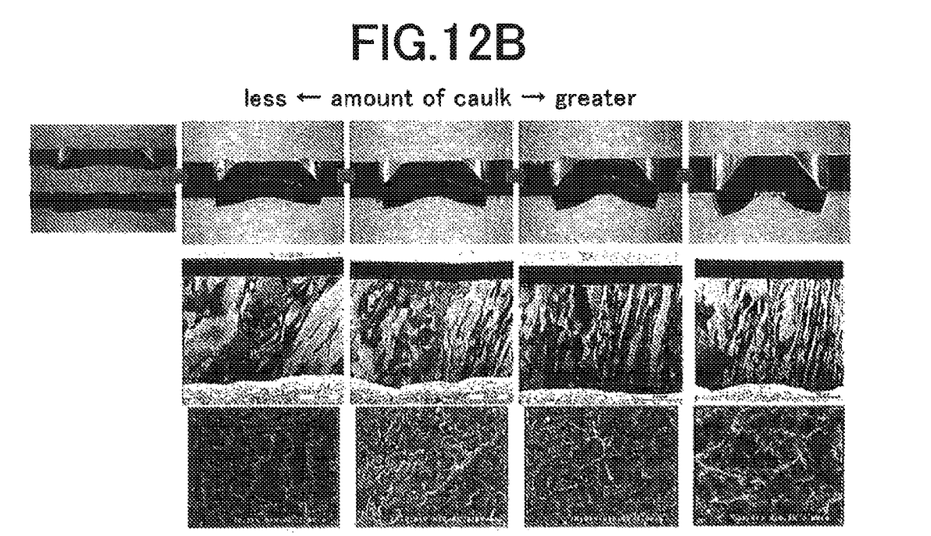
FIG. 12B shows SIM of joint interface (i.e., joint boundary) and SEM of delaminated (exfoliated) surface.

The appearance of the sample in the cross-section is shown in FIG. 12A. Furthermore, SIM for joint interface and SEM for delaminated surface are shown in FIG. 12B. The above observations show that if an amount of squash or squeeze an amount of caulk) is sufficient a metal joint or metal joining can be obtained.

While a preferred embodiment of the invention has been shown and described with particularity, it will be appreciated that various changes and modifications may suggest themselves to one having ordinary skill in the art upon being apprised of the present invention. It is also intended to encompass all such changes and modifications as fall within the scope and spirit of the appended claims.

The invention claimed is:

1. A composite metal sheet produced by joining at least two metal sheets together, comprising:
   projections formed in each of overlapping metal sheets;
   holes formed in each of the overlapping metal sheets; and
   a joint formed between the overlapping metal sheets and between each projection and each hole of each overlapping metal sheet,
   wherein
   the projections are formed by pressing and thus cutting the overlapping metal sheets along two cutting lines relative to a same uncut reference line such that each cutting line extends from and communicates with both terminals of the reference line, each projection having a portion whose width is wider than a length of the uncut reference line,
   each hole is formed by further pressing each cut projection relative to the uncut reference line and toward one of the overlapping metal sheets,
   the joint is formed between an outer peripheral cutting face of the projection of a first metal sheet and an inner peripheral cutting face of the hole of a second metal sheet due to friction between the portion of the outer peripheral face of the projection of the first metal sheet that is wider than the length of the uncut reference line, and the inner peripheral cutting face of the hole of the second metal sheet during the pressing, and due to the friction the outer peripheral cutting face of the projection of the first metal sheet and the inner peripheral cutting face of the hole of the second metal sheet are adhered to each other in the joint.

2. The composite metal sheet according to claim 1, wherein the cutting line substantially forms a trapezoidal shape together with the reference line, with the reference line being a short side.

3. The composite metal sheet according to claim 1, wherein a joint is further formed in an area where the first and second metal sheets overlap each other due to deformation and friction between a lower face of the first metal and an upper face of the second metal sheet during the pressing.

4. The composite metal sheet according to claim 1, wherein the joint is formed by the pressing so as to increase a normal load and a friction distance to increase an amount of an adhesion between the portion of the outer peripheral cutting face of the projection of the first metal sheet and the inner peripheral cutting face of the hole of the second metal sheet,
the adhesion follows a formula as depicted:

$$A_a = \zeta P/P_m$$

in above formula, $A_a$ is an adhesion surface area when two solid objects are contacted with each other, $\zeta$ is a surface coefficient, P is a normal load, and $P_m$ is a plastic flow pressure of material.

5. A composite metal sheet produced by joining at least two metal sheets together, comprising:
   projections formed in each of overlapping metal sheets;
   holes formed in each of the overlapping metal sheets; and
   a joint formed between the overlapping metal sheets and between each projection and each hole of each overlapping metal sheet,
   wherein
   the joint is formed between an outer peripheral cutting face of the projection of a first metal sheet and an inner peripheral cutting face of the hole of a second metal sheet with an adhesion, the adhesion follows a formula as depicted:

$$A_a = \zeta P/P_m$$

in above formula, $A_a$ is an adhesion surface area when two solid objects are contacted with each other, $\zeta$ is a surface coefficient, P is a normal load, and $P_m$ is a plastic flow pressure of material.

* * * * *